(12) United States Patent
Christensson et al.

(10) Patent No.: US 8,682,848 B2
(45) Date of Patent: Mar. 25, 2014

(54) METHOD AND SYSTEM FOR AUTOMATIC DETECTION OF MULTIMEDIA SETTINGS

(75) Inventors: Nils Christensson, Vellinge (SE); Paul M. Grant, Earith Huntingdon (GB)

(73) Assignee: Broadcom Corporation, Irvine, CA (US)

( * ) Notice: Subject to any disclaimer, the term of this patent is extended or adjusted under 35 U.S.C. 154(b) by 238 days.

(21) Appl. No.: 12/262,852

(22) Filed: Oct. 31, 2008

(65) Prior Publication Data

US 2010/0010969 A1 Jan. 14, 2010

Related U.S. Application Data

(60) Provisional application No. 61/078,993, filed on Jul. 8, 2008.

(51) Int. Cl.
*G06F 17/30* (2006.01)

(52) U.S. Cl.
USPC .......................................... 707/621; 707/675

(58) Field of Classification Search
USPC ................ 707/620–623, 667–682, 802–810; 77/802–810
See application file for complete search history.

(56) References Cited

U.S. PATENT DOCUMENTS

| | | | | |
|---|---|---|---|---|
| 7,848,622 B2* | 12/2010 | Hsieh et al. | .................... | 386/326 |
| 8,010,711 B2* | 8/2011 | Amron et al. | ..................... | 710/8 |
| 8,145,041 B2* | 3/2012 | Ueda et al. | .................... | 386/328 |
| 2002/0047899 A1* | 4/2002 | Son et al. | ........................ | 348/114 |
| 2002/0138641 A1* | 9/2002 | Taylor et al. | .................. | 709/231 |
| 2005/0097168 A1* | 5/2005 | Mukherjee et al. | ........... | 709/204 |
| 2007/0127888 A1* | 6/2007 | Hayashi et al. | .................. | 386/96 |
| 2007/0153918 A1* | 7/2007 | Rodriguez | ............... | 375/240.29 |
| 2007/0226365 A1* | 9/2007 | Hildreth et al. | ............... | 709/231 |
| 2008/0168135 A1* | 7/2008 | Redlich et al. | ................ | 709/204 |
| 2008/0184297 A1* | 7/2008 | Ellis et al. | ........................ | 725/39 |
| 2008/0250459 A1* | 10/2008 | Roman | ........................... | 725/62 |
| 2008/0307128 A1* | 12/2008 | Amron et al. | .................... | 710/65 |
| 2008/0310515 A1* | 12/2008 | Matsuba et al. | ........... | 375/240.24 |
| 2009/0037382 A1* | 2/2009 | Ansari et al. | ....................... | 707/3 |
| 2009/0119322 A1* | 5/2009 | Mills et al. | ..................... | 707/101 |
| 2009/0125677 A1* | 5/2009 | Leveque et al. | ............... | 711/113 |
| 2009/0164564 A1* | 6/2009 | Willis | .......................... | 709/203 |
| 2009/0248794 A1* | 10/2009 | Helms et al. | ................... | 709/203 |
| 2009/0254672 A1* | 10/2009 | Zhang | ........................... | 709/231 |
| 2009/0286560 A1* | 11/2009 | Willis | ........................... | 455/466 |
| 2010/0023979 A1* | 1/2010 | Patel et al. | ........................ | 725/93 |
| 2010/0042747 A1* | 2/2010 | Hascalovici et al. | ......... | 709/246 |
| 2010/0135473 A1* | 6/2010 | Dewing et al. | ............. | 379/88.13 |

OTHER PUBLICATIONS

Dictionary of Computer Science, Engineering, and Technology, CRC Press LLC, p. 158, 2001.*
Microsoft Computer Dictionary, Microsoft Press, copyright 1997, p. 113.*
The RandomHouse College Dictionary, Random House Inc, copyright 1982, p. 358.*

* cited by examiner

*Primary Examiner* — Wilson Lee
(74) *Attorney, Agent, or Firm* — Sterne, Kessler, Goldstein & Fox PLLC

(57) ABSTRACT

Provided is a method for transferring multimedia content from the first device to a second device. The method includes scanning a memory associated with the second device to identify transcoding parameters associated and stored therein. The method also includes transcoding the multimedia content from the first device based upon the identified transcoding parameters.

21 Claims, 4 Drawing Sheets

METHOD AND SYSTEM FOR AUTOMATIC DETECTION OF MULTIMEDIA SETTINGS

CROSS-REFERENCE TO RELATED APPLICATIONS

This application claims benefit to U.S. Provisional Application No. 61/078,993, filed Jul. 8, 2008, which is incorporated by reference in its entirety.

BACKGROUND OF THE INVENTION

1. Field of the Invention

The present invention generally relates to multimedia content storage. More particularly, the present invention relates to transferring stored multimedia content between multimedia devices.

2. Background Art

A number of commercially available products permit users to record multimedia content and transfer this recorded content to portable devices, such as mobile phones, personal digital assistants (PDAs), notebook computers, and the like. These products enable users to record, for example, video content onto a flash memory card and then insert this memory card into the user's mobile phone for viewing at a later time.

Typically, to transfer this stored multimedia content from the flash memory card to a memory within the user's mobile phone, the user is required to manually select the correct content file configuration, video format, and resolution, among other settings, before storing it in the user's mobile phone. This selection process occurs via a menu driven graphical user interface (GUI) enabling the user make the selections. These selections are chosen from among a large number of available options related to content file configurations, video formats, resolutions, and other setting associated with the stored video content presented to the user via the menu and the GUI. A significant deficiency in this process, however, is that many of these user selectable settings can be complicated and based upon information not readily known by the average user.

What is needed, therefore, are methods and systems to resolve the aforementioned deficiencies pertaining to transferring and transcoding recorded multimedia content from products, such as flash drives, to devices such as mobile phones, PDAs, notebook computers, and the like. More specifically, what is needed are methods and systems to facilitate transcoding and playback of recorded multimedia content on a third device, and to enhance interoperability between products and vendors.

BRIEF SUMMARY OF THE INVENTION

Consistent with the principles of the present invention as embodied and broadly described herein, the present invention includes a method for transferring multimedia content from the first device to a second device. The method includes scanning a memory associated with the second device to identify transcoding parameters associated and stored therein. The method also includes transcoding the multimedia content from the first device based upon the identified transcoding parameters.

The present invention provides a unique approach to facilitating the transfer of multimedia content from products, such as flash drives and other storage mediums, to devices such as mobile phones, PDAs, notebook computers, handheld game consoles, and video music players, to name a few. In the present invention, multimedia content such as a live multimedia stream, for example, can easily be recorded by a user onto a flash memory card using a desk top computer, and then later transferred to the user's mobile phone. Products including various embodiments of the present invention, will be able to automatically assess file characteristics related to the stored multimedia content (e.g. video content) and then properly transcode content to playback on the user's mobile phone, PDA, notebook computer, etc, to the proper settings. The process will consequently enable the user to automatically store this content without having to make complicated menu choices that may be beyond the knowledge of the average user.

More specifically, the present invention facilitates automatic recognition that files containing stored multimedia content are of a particular structure and/or format. As one example, characteristics of files stored on the user's mobile phone are indicative of the decode settings, video resolution settings, and other multi-media characteristics. Then based upon this information, the present invention can reliably make other assumptions about the stored multimedia content. These other assumptions, consequently, enable the memory within the user's mobile phone to be configured to the proper settings for storage and playback of the recorded multimedia content.

Further embodiments, features, and advantages of the present invention, as well as the structure and operation of the various embodiments of the present invention, are described in detail below with reference to the accompanying drawings.

BRIEF DESCRIPTION OF THE DRAWINGS/FIGURES

The accompanying drawings, which are incorporated herein and form part of the specification, illustrate the present invention and, together with the description, further serve to explain the principles of the invention and to enable a person skilled in the relevant art(s) to make and use the invention.

DETAILED DESCRIPTION OF THE INVENTION

The following detailed description of the present invention refers to the accompanying drawings that illustrate exemplary embodiments consistent with this invention. Other embodiments are possible, and modifications may be made to the embodiments within the spirit and scope of the invention. Therefore, the detailed description is not meant to limit the invention. Rather, the scope of the invention is defined by the appended claims.

It would be apparent to one of skill in the art that the present invention, as described below, may be implemented in many different embodiments of software, hardware, firmware, and/or the entities illustrated in the figures. Any actual software code with the specialized control of hardware to implement the present invention is not limiting of the present invention. Thus, the operational behavior of the present invention will be described with the understanding that modifications and variations of the embodiments are possible, given the level of detail presented herein.

Figure 1:
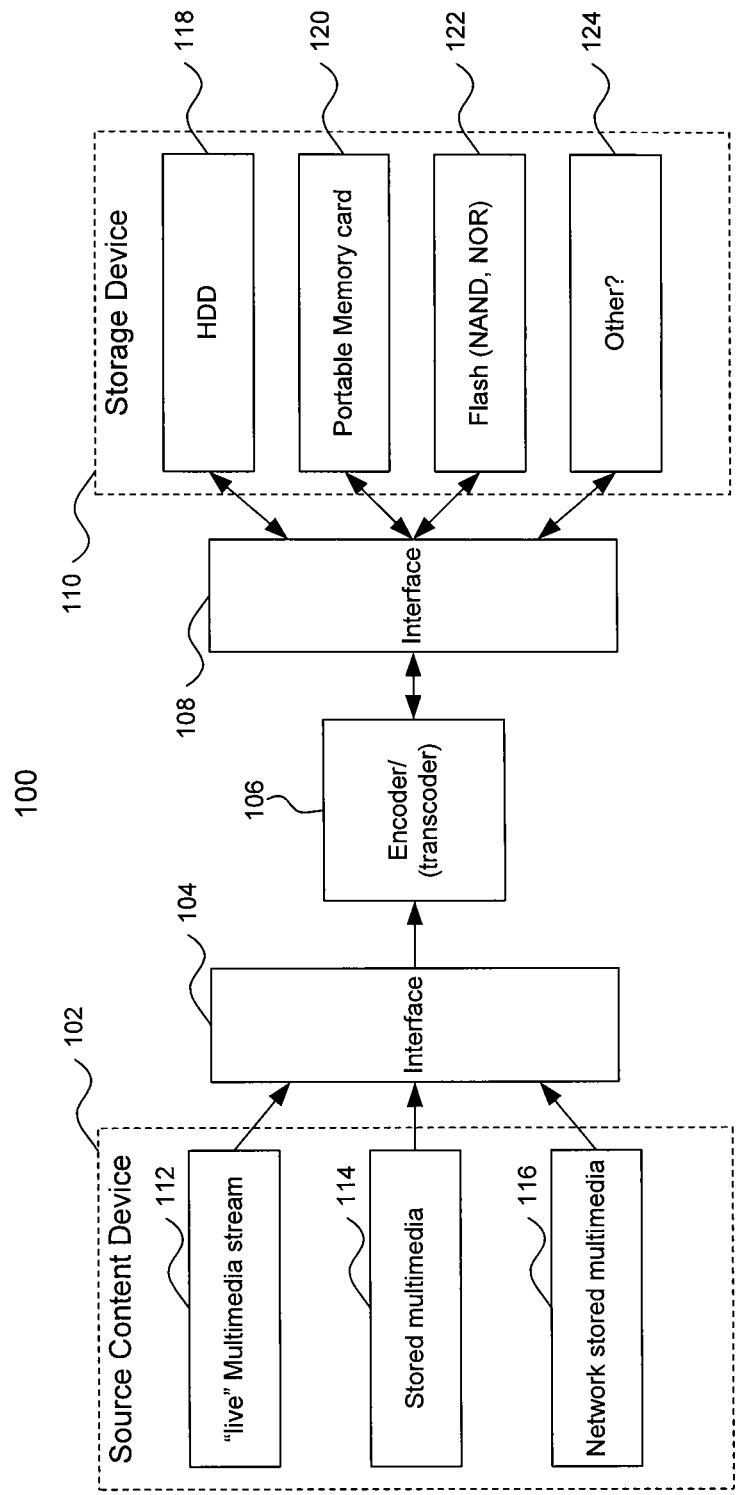
FIG. 1 is a block diagram illustration of an exemplary system in which the present invention can be practiced.

FIG. 1 is a block diagram illustration of an exemplary system in which the present invention can be practiced. FIG. 1 depicts a multimedia system 100 including a source content device 102, a first interface device 104, an encoder/transcoder 106, a second interface device 108, and storage device 110. Generally, the encoder/transcoder device 106 is configured to encode or transcode multimedia (audio and/or video) content to storage devices, such as mobile phones, handheld game consoles, PDAs, video music players, notebook computers, personal music players, or the like. The source content device 102 can include, for example, a live media stream downloaded onto a memory within a PC.

The coding or decoding capabilities of the storage device 110 are not readily known or available to a user, but can be communicated to the user via interface protocols. This process can be described as moving content from the source content device 102 to the storage device 110. The encoder/transcoder device 106 is configured to access content stored in a memory within the source content device 102, via the interfaces 104. The encoder/transcoder 106 then transfers this content to the storage device 110, via the interface 108.

Within the system 100, the content stored on the source content device 102 can be representative of a live multimedia stream 112, stored multimedia 114, or network stored multimedia 116. As known to those of skill in the art, the network stored multimedia 116 can represent media stored via a network, such as the Internet. The content stored on the source content device 102 can also represent many other forms of multimedia content well understood by those of skill in the art.

Different storage mediums within the storage device 110 can include a computer hard drive 118, a portable memory card 120, a flash drive 122, or numerous other mediums 124, also understood by those of skill in the art.

Figure 2:
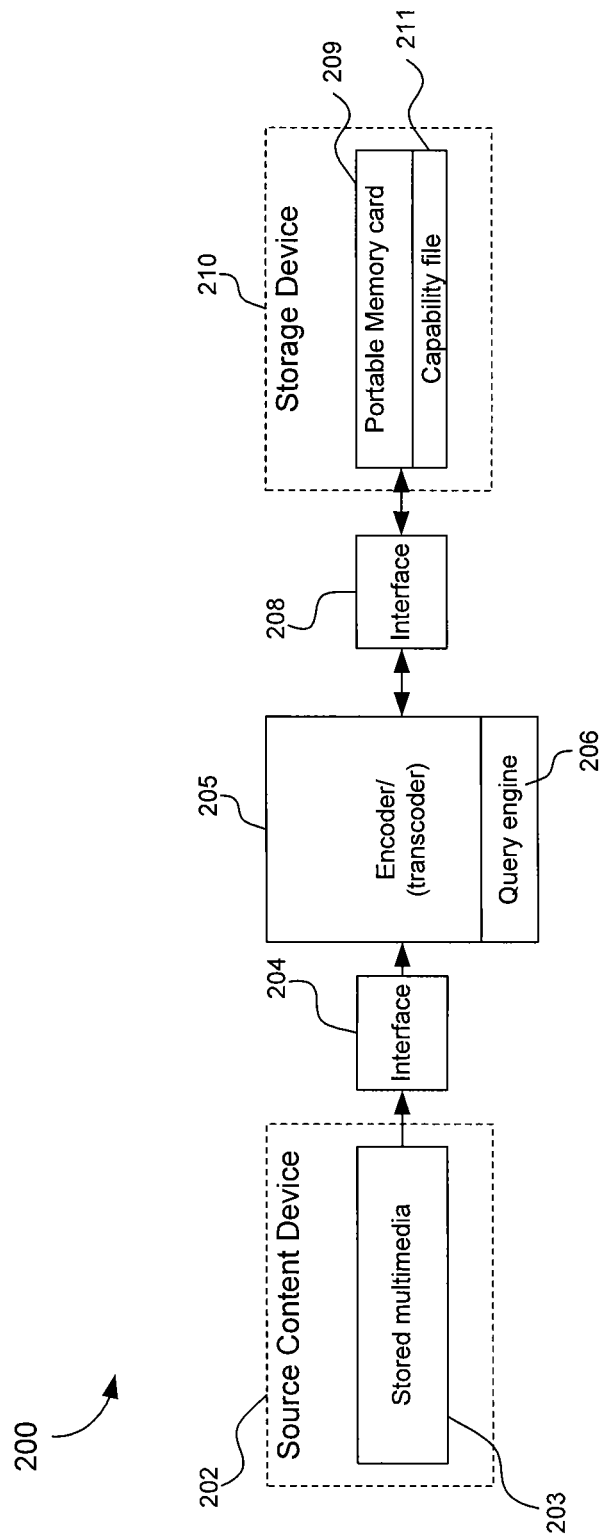
FIG. 2 is a detailed block diagram of a multimedia file detection system configured in accordance with an embodiment of the present invention.

FIG. 2 is a more detailed block diagram illustration of a multimedia file detection system 200, constructed in accordance with an embodiment of the present invention. In FIG. 2, the multimedia system 200 includes a source content device 202 configured to store a multimedia content file 203. In the system 200, a first interface 204 facilitates transfer of the stored multimedia content file 203 from the source content device 202 to an encoder/transcoder 205. A second interface 208 facilitates transfer of the stored multimedia content 203 to a portable memory card 209 within a storage device 210.

In the system 200, the portable memory card 209 is coupled to the encoder/transcoder 205 via a card reader (not shown). A query engine 206, associated with the encoder 205, scans the portable memory card 209 for a capability file 211. As understood by those of skill in the art, the capability file 211 is a general description of a file that instructs the query engine 206 of the capabilities and settings of storage mediums, such as the portable memory card 209, within the storage device 210.

The capability file 211, by way of example, could be a standard .txt file with clear text of what codec settings, resolution, frame rate etc., are preferred by the device 210 and/or the portable memory card 209. The capability file 211 can also be a very short dummy clip that includes all of the characteristics of an associated multimedia file. In order to minimize its size, however, the capability file 211 will have very little, or zero, multimedia content.

In the exemplary embodiment of FIG. 2, the query engine 206 could alternatively write a new capability file onto the memory card 209 if a capability file does not already exist. This newly created capability file would be written based upon the results gathered from the query engine 206, based upon previous user interaction with the storage device 210. Another alternative approach, in the absence of a pre-existing capability file, would be to allow for a short initiation time to scan selected portions of pertinent files within the portable memory card 209 to ascertain the codec settings, resolution, frame rate etc. This short initiation time will preclude the need to waste time scanning entire files within the portable memory card 209, to derive this information.

As noted above, during system operation, the query engine 206 scans the portable memory card 209 to determine whether a capability file, such as the capability file 211, already exists. If a capability file exists, the query engine 206 obtains the format and settings, based upon the capability file, associated with the multimedia content file 203 stored on the portable memory card 209.

By way of example, the query engine 206 might find a stored Motion Pictures Expert Group-4 (MP4) file stored on the portable memory card 209. In accordance with the present invention, the query engine 206 will then identify the precise parameters required for coding multimedia content onto the portable memory card 209. As a step in this identification process, the query engine 206 will scan for a pre-existing capability file on the memory card 209. If no capability file is found, the query engine 206 will create its own capability file, and will then store this newly created capability file in the portable memory card 209, for future use. Next, the query engine 206 will begin transcoding the stored multimedia content 203 using the settings found in the capability file 211. Based upon these settings, the query engine 206 will begin storing the multimedia content 203 onto the portable memory card 209.

It is well understood by those of skill in the art, that the multimedia content 203 can be stored in a number of different storage mediums. For example, the stored multimedia content 203 can be a prerecorded live stream such as a broadcast through cable or satellite. Alternatively, the content 203 could actually be live and in real time, and would thus be not stored. Examples of devices to control this content include, for example, a digital video disc (DVD) player, a PC, or the like.

The portable memory card 209 could also be, for example, a hard disk drive (HDD), a DVD player, a flash memory, or similar. Control of these mediums can reside within a PC, a personal video recorder, or other digital storage device. Access to these storage mediums can occur directly via a GUI, or through a network connection, either wired or wireless.

Given the different mediums and control devices discussed above, the interface 204 can be, but is not limited to, video/audio signals such as component, separated video (S-Video), composite video, high definition multimedia interface (HDMI), digital visual interface (DVI), router control interface (RCI), and Syndicat des Constructeurs d'Appareils Radiorécepteurs et Téléviseurs (SCART), to name a few. The interface 204 can also be a generic wired device such as a universal serial bus (USB), Firewire or Ethernet. On the other hand the interface 204 can represent a wireless interface standard such as 802.11, ultra wideband (UWB), Blue Tooth (BT), and/or cellular.

The encoder 205 can be a standard codec, as discussed in further detail below.

The query engine 206 can be internal or external to the encoder 205, and will have access to the storage medium, such as the portable memory card 209, via the interface 208. As understood by those of skill in the art, a query engine, such as the query engine 206, will have the ability to read stored files on a target memory device.

In embodiments of the present invention, as illustrated in FIG. 2, the encoder 205 is configured to connect to the portable memory card 209, which is not necessarily always under control of the storage device 210, via the interface 208. By way of example, the interface 208 can be, a USB, secure digital I/O (SDIO), integrated drive electronics (IDE), serial advanced technology attachment (SATA), Ethernet, and/or wireless etc., to name a few.

In order to perform the query, the query engine 206, in association with the encoder 205, will check the storage medium, such as the portable memory card 209, for presence of a capability file, such as the capability file 211. If a capability file is not present, the query engine will check multimedia content previously stored on the portable memory card 209. Information on how to determine what codec and configuration settings have been used will vary between codecs and will continue to evolve as new multimedia standards develop. Already existing standards include, for example, 0.3gp, or 0.3g2, which determine what codecs and settings are supported. Other formats, for example, stipulate that such information be embedded within the associated multimedia stream.

Query engines capable of performing in accordance with embodiments of the present invention currently exist and are commercially available.

Figure 3:
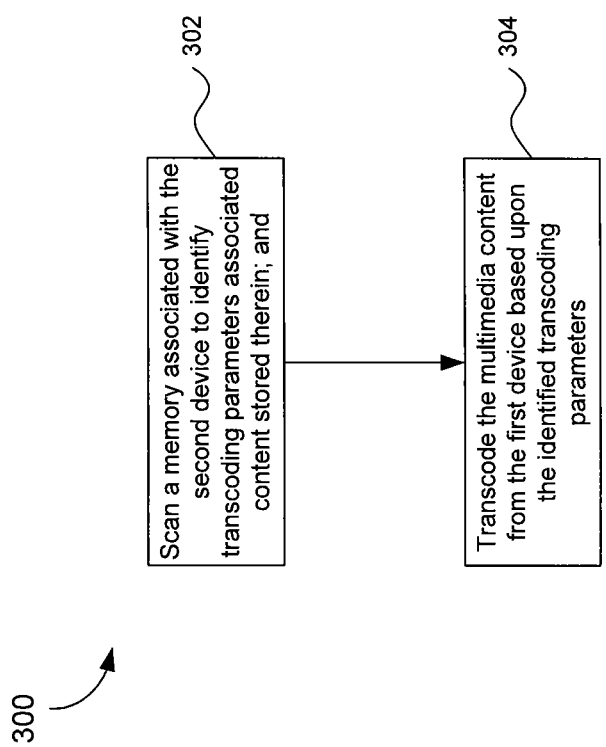
FIG. 3 is an exemplary flowchart of a method of practicing an embodiment of the present invention.

FIG. 3 is an exemplary method 300 practicing an embodiment of the present invention. In FIG. 3, the method 300 includes step 302 for scanning a memory associated with a second device to identify transcoding parameters associated with contents stored therein. Step 304 includes transcoding the multimedia content from the first device based upon the identified transcoding parameters and configuring the multimedia content for storage on the memory associated with the second device.

The following description of a general purpose computer system is provided for completeness. The present invention can be implemented in hardware, or as a combination of software and hardware. Consequently, the invention may be implemented in the environment of a computer system or other processing system.

Figure 4:
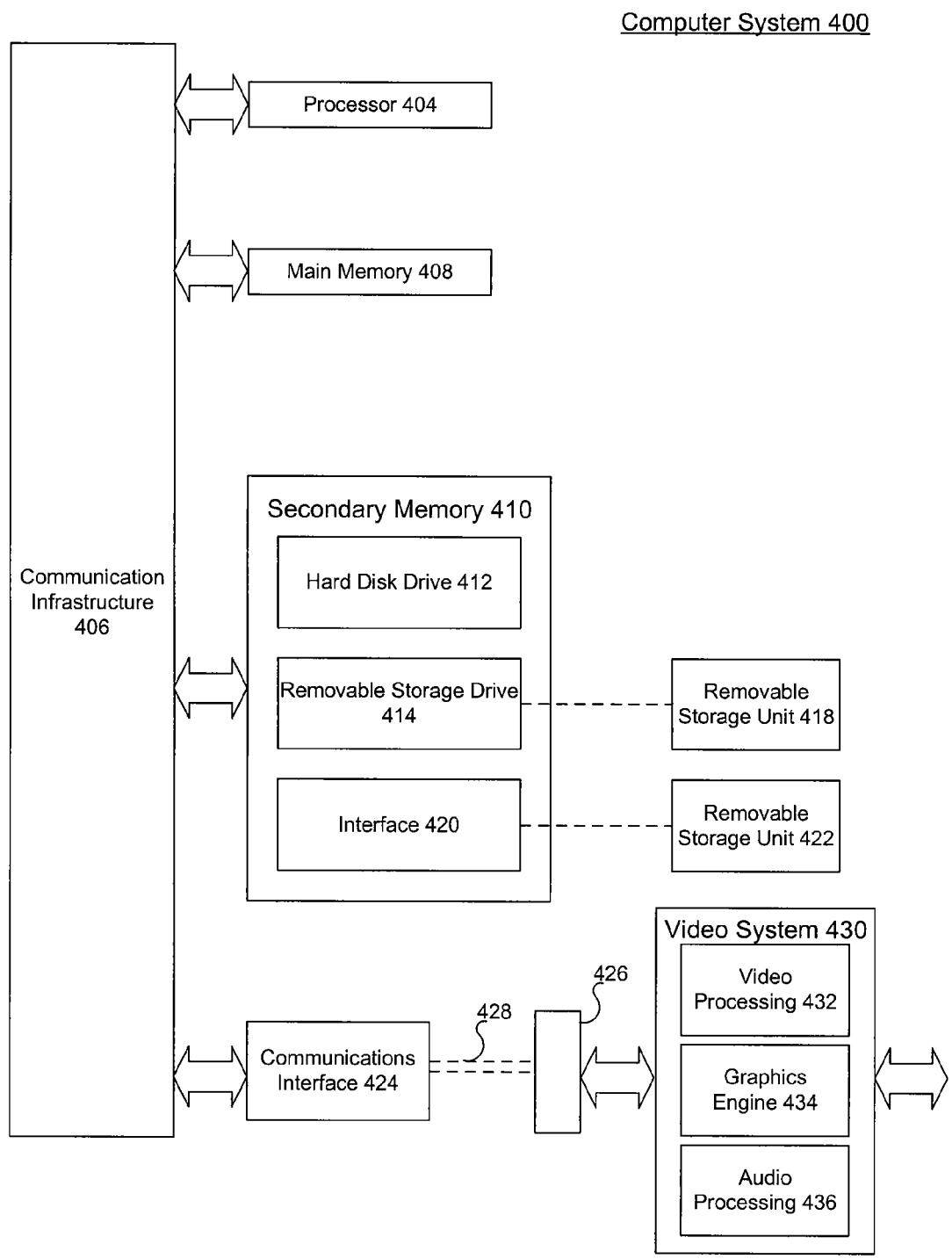
FIG. 4 is a block diagram illustration of an exemplary computer system on which the present invention can be practiced.

An example of such a computer system 400 is shown in FIG. 4. In the present invention, all of the elements depicted in FIGS. 1-3, for example, can execute on one or more distinct computer systems 400, to implement the various methods of the present invention. The computer system 400 includes one or more processors, such as a processor 404. The processor 404 can be a special purpose or a general purpose digital signal processor.

The processor 404 is connected to a communication infrastructure 406 (for example, a bus or network). Various software implementations are described in terms of this exemplary computer system. After reading this description, it will become apparent to a person skilled in the relevant art how to implement the invention using other computer systems and/or computer architectures.

The computer system 400 also includes a main memory 408, preferably random access memory (RAM), and may also include a secondary memory 410. The secondary memory 410 may include, for example, a hard disk drive 412 and/or a removable storage drive 414, representing a floppy disk drive, a magnetic tape drive, an optical disk drive, etc.

The removable storage drive 414 reads from and/or writes to a removable storage unit 418 in a well known manner. The removable storage unit 418, represents a floppy disk, magnetic tape, optical disk, etc. which is read by and written to by the removable storage drive 414. As will be appreciated, the removable storage unit 418 includes a computer usable storage medium having stored therein computer software and/or data.

In alternative implementations, the secondary memory 410 may include other similar means for allowing computer programs or other instructions to be loaded into the computer system 400. Such means may include, for example, a removable storage unit 422 and an interface 420.

Examples of such means may include a program cartridge and cartridge interface (such as that found in video game devices), a removable memory chip (such as an EPROM, or PROM) and associated socket, and other removable storage units 422 and interfaces 420 which allow software and data to be transferred from the removable storage unit 422 to the computer system 400.

The computer system 400 may also include a communications interface 424. The communications interface 424 allows software and data to be transferred between the computer system 400 and external devices. Examples of the communications interface 424 may include a modem, a network interface (such as an Ethernet card), a communications port, a PCMCIA slot and card, etc.

Software and data transferred via the communications interface 424 are in the form of signals 428 which may be electronic, electromagnetic, optical or other signals capable of being received by the communications interface 424. These signals 428 are provided to the communications interface 424 via a communications path 426. The communications path 426 carries the signals 428 and may be implemented using wire or cable, fiber optics, a phone line, a cellular phone link, an RF link and other communications channels.

The communications path 426 can couple the communications interface 424 to an exemplary video system 430. By way of example, the video system 430 can include a video processing module 432, a graphics engine 434, and an audio processing module 436.

In the present application, the terms "computer readable medium" and "computer usable medium" are used to generally refer to media such as the removable storage drive 414, a hard disk installed in the hard disk drive 412, and the signals 428. These computer program products are means for providing software to the computer system 400.

Computer programs (also called computer control logic) are stored in the main memory 408 and/or the secondary memory 410. Computer programs may also be received via the communications interface 424. Such computer programs, when executed, enable the computer system 400 to implement the present invention as discussed herein.

In particular, the computer programs, when executed, enable the processor 404 to implement the processes of the present invention. Accordingly, such computer programs represent controllers of the computer system 400. By way of example, in the embodiments of the invention, the processes/methods performed by signal processing blocks of encoders and/or decoders can be performed by computer control logic.

CONCLUSION

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A method for transferring multimedia content from a first device to a second device, comprising:
   determining whether a capability file is stored in the second device, the capability file including transcoding parameters associated with storage of multimedia content in the second device;
   accessing the capability file to determine the transcoding parameters, if the capability file is stored in the second device;
   deriving the transcoding parameters from a multimedia content file stored in the second device and creating another capability file based upon the transcoding parameters derived from the multimedia content file, if the capability file is not stored in the second device;
   transcoding another multimedia content file stored in the first device based upon the transcoding parameters to provide a transcoded multimedia content file; and
   transferring the transcoded multimedia content file to the second device.

2. The method of claim 1, further comprising:
   storing the another capability file in a memory associated with the second device.

3. An apparatus comprising:
   a processor configured to transfer multimedia content from a first device to a second device;
   an identifier engine configured to:
      determine whether a capability file is stored in the second device, the capability file including transcoding parameters associated with storage of multimedia content in the second device;
      access the capability file to determine the transcoding parameters, if the capability file is stored in the second device; and
      derive the transcoding parameters from a multimedia content file stored in the second device, if the capability file is not stored in the second device;
   a file creator engine configured to create another capability file based upon the transcoding parameters derived from the multimedia content file, if the capability file is not stored in the second device;
   a transcoder engine configured to transcode another multimedia content file stored in the first device based upon the transcoding parameters to provide a transcoded multimedia content file; and
   a transfer engine configured to transfer the transcoded multimedia content file to the second device.

4. The apparatus of claim 3, further comprising:
   a storing engine configured to store the another capability file in a memory associated with the second device.

5. The method of claim 1, wherein the transferring comprises:
   transferring the transcoded multimedia content file directly to the second device without storing the transcoded multimedia content file in the first device.

6. The method of claim 1, further comprising:
   reading files stored in the second device to identify the capability file.

7. The method of claim 1, wherein the capability file and the another capability file are text files.

8. The method of claim 1, wherein the capability file and the another capability file include characteristics of an associated multimedia file but no multimedia content.

9. The method of claim 1, further comprising:
   scanning a memory associated with the second device to identify the capability file.

10. The apparatus of claim 3, wherein the transfer engine is further configured to transfer the transcoded multimedia content file directly to the second device without storing the transcoded multimedia content file in the first device.

11. The apparatus of claim 3, wherein the identifying engine is further configured to read files stored in the second device to identify the capability file.

12. The apparatus of claim 3, wherein the identifier engine is further configured to access the another multimedia content file stored in a memory associated with the first device via a first interface, and
   wherein the transcoder engine is further configured to transfer the transcoded multimedia content file to the second device via a second interface.

13. The apparatus of 12, wherein the first interface is configured to facilitate transfer of the another multimedia content file from the first device to the transcoder engine, and
   wherein the second interface is configured to facilitate transfer of the transcoded multimedia content file from the transcoder engine to the second device.

14. The apparatus of claim 3, wherein the capability file and the another capability file are text files.

15. The apparatus of claim 3, wherein the capability file and the another capability the include characteristics of an associated multimedia file but no multimedia content.

16. In an encoder/transcoder device, a method for transferring multimedia content files from a first device to a second device, comprising:
   searching a memory associated with the second device to find a first capability file, the first capability file including transcoding parameters for transfer of a multimedia content file from the first device to the second device; and
   if the first capability file is not found:
      searching the memory for another multimedia content file;
      deriving the transcoding parameters from the another multimedia content file; and
      creating a second capability file from the transcoding parameters;
   transcoding the multimedia content file stored in the first device utilizing the transcoding parameters from the first capability file, if the first capability file is found, to provide a transcoded multimedia content file;

transcoding the multimedia content file utilizing the transcoding parameters from the second capability file, if the first capability file is not found, to provide the transcoded multimedia content file; and transferring the transcoded multimedia content file to the second device.

17. The method of claim 16, wherein the transferring comprises:

transferring the transcoded multimedia content file directly to the second device without storing the transcoded multimedia content file in the first device.

18. The method of claim 16, wherein the first and second capability files include characteristics of an associated multimedia file but no multimedia content.

19. The method of claim 1, wherein the capability file and the another capability file include at least one of:

multimedia settings;
codec settings; or
frame rate settings.

20. The apparatus of claim 3, wherein the capability file and the another capability file include at least one of:

multimedia settings;
codec settings; or
frame rate settings.

21. The method of claim 16, wherein the first and second capability files include at least one of:

multimedia settings;
codec settings; or
frame rate settings.

* * * * *